US 9,070,005 B2

(12) United States Patent
Ozaki et al.

(10) Patent No.: US 9,070,005 B2
(45) Date of Patent: Jun. 30, 2015

(54) IMAGE PROCESSING APPARATUS, IMAGE PROCESSING METHOD, NON-TRANSITORY COMPUTER-READABLE MEDIUM, AND IMAGE PROCESSING SYSTEM FOR DETECTION OF TARGET CELLS USING IMAGE FEATURE DETERMINATION

(71) Applicant: FUJI XEROX CO., LTD., Tokyo (JP)

(72) Inventors: Ryota Ozaki, Yokohama (JP); Hideto Oda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 82 days.

(21) Appl. No.: 13/665,158

(22) Filed: Oct. 31, 2012

(65) Prior Publication Data

US 2013/0163844 A1  Jun. 27, 2013

(30) Foreign Application Priority Data

Dec. 21, 2011 (JP) .................. 2011-279338

(51) Int. Cl.
G06K 9/00 (2006.01)
(52) U.S. Cl.
CPC .................. G06K 9/0014 (2013.01)
(58) Field of Classification Search
CPC ....... G06F 19/345; G06F 19/18; G06F 19/24; G06K 9/00127; G06K 9/46; G06Q 50/22; G06T 2207/10056; G06T 2207/20148; G06T 2207/30024; G06T 7/0012; G06T 7/0085
See application file for complete search history.

(56) References Cited

U.S. PATENT DOCUMENTS 5,671,288 A * 9/1997 Wilhelm et al. ............... 382/128
5,768,412 A * 6/1998 Mitsuyama et al. .......... 382/173
5,949,907 A * 9/1999 Raz .............................. 382/205
(Continued)

FOREIGN PATENT DOCUMENTS

JP 2004-248619 * 9/2004
JP A-2004-248619 9/2004
(Continued)

OTHER PUBLICATIONS

Merchant et al., Strategies for automated fetal cell screening, 2002, Human Reproduction Update, vol. 8, No. 6 pp. 509-521.*
(Continued)

*Primary Examiner* — Barry Drennan
*Assistant Examiner* — Guillermo Rivera-Martinez
(74) *Attorney, Agent, or Firm* — Oliff PLC

(57) ABSTRACT

An image processing apparatus includes an obtaining unit, a first extraction unit, a second extraction unit, a setting unit, a filter setting unit, a generating unit, and a determination unit. The obtaining unit obtains a captured image of a test piece including a target cell having a nucleus. The first extraction unit extracts pixels which are candidates for the nucleus from pixels included in the captured image. The second extraction unit extracts a connected-pixel group which is a candidate for the target cell. The setting unit sets rectangular regions in the captured image. The filter setting unit sets a filter including regions. When the filter is disposed in each of the rectangular regions, the generating unit generates an image feature value. The determination unit determines, on the basis of whether the image feature value satisfies a condition, whether the target cell is included in the rectangular region.

16 Claims, 18 Drawing Sheets

(56) References Cited

U.S. PATENT DOCUMENTS

| | | | |
|---|---|---|---|
| 6,430,309 B1* | 8/2002 | Pressman et al. | 382/133 |
| 7,006,674 B1* | 2/2006 | Zahniser et al. | 382/128 |
| 7,450,762 B2* | 11/2008 | Morell | 382/199 |
| 7,826,652 B2* | 11/2010 | Hunt | 382/133 |
| 8,116,543 B2* | 2/2012 | Perz et al. | 382/128 |
| 2002/0081014 A1* | 6/2002 | Ravkin | 382/134 |
| 2002/0123977 A1* | 9/2002 | Raz | 706/15 |
| 2002/0186874 A1* | 12/2002 | Price et al. | 382/133 |
| 2006/0039593 A1* | 2/2006 | Sammak et al. | 382/133 |
| 2010/0074506 A1* | 3/2010 | Yamada | 382/133 |
| 2010/0232675 A1* | 9/2010 | Ortyn et al. | 382/134 |

FOREIGN PATENT DOCUMENTS

| | | |
|---|---|---|
| JP | B2-4346923 | 9/2004 |
| WO | WO 0049391 A1 * | 8/2000 |

OTHER PUBLICATIONS

Safabakhsh et al., A Robust Multi-Orientation Gabor Based System for Discriminating Touching White and Red Cells in Microscopic Blood Image, 2006, Information and Communication Technologies, vol. 1, pp. 1135-1139.*

Liu et al., Automatic Segmentation on Cell Image Fusing Gray and Gradient Information, Aug. 2007, Proceedings of the 29th Annual International Conference of the IEEE EMBS, pp. 5624-5627.*

Di Cataldo et al., Automated segmentation of tissue images for computerized IHC analysis, Oct. 2010, Computer Methods and Programs in Biomedicine, vol. 100, Issue 1, pp. 1-15.*

Mar. 12, 2013 Office Action issued in Japanese Patent Application No. 2011-279338 (with translation).

Aoki et al., "Automatic Extraction of Nucleated Red Cells from Large Number of Microscopic Images," *The Journal of the Institute of Image Electronics Engineers of Japan*, 2008, pp. 609-616, vol. 37, No. 5 (with partial translation).

* cited by examiner

NUCLEUS-CANDIDATE REGIONS

TARGET-CELL-CANDIDATE REGIONS

DETERMINATION-TARGET REGION

DETERMINATION-TARGET REGION

DIRECTION VECTOR

DIRECTION VECTOR

DETERMINATION-TARGET REGION

FIG. 10
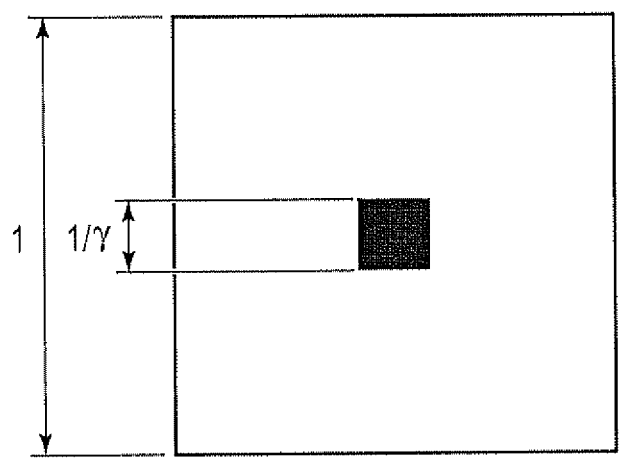
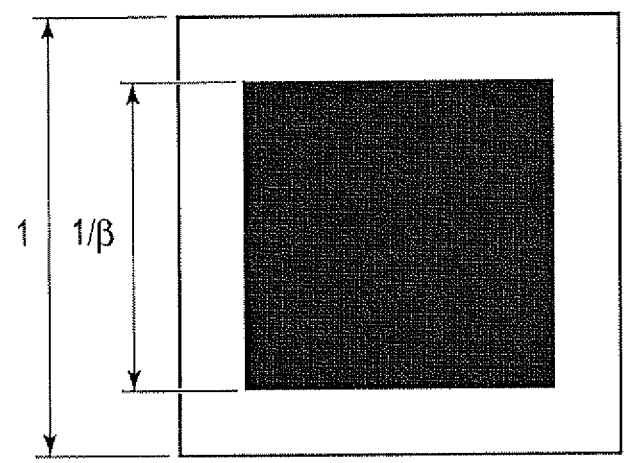

FIG. 11
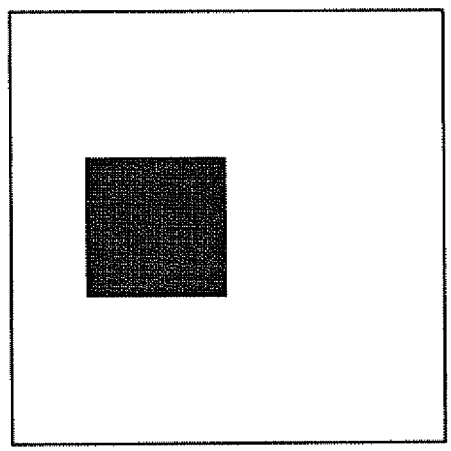
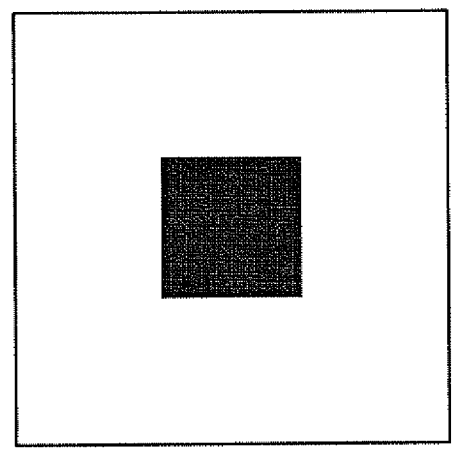
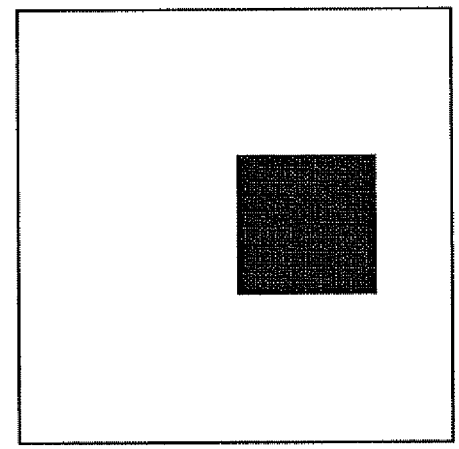

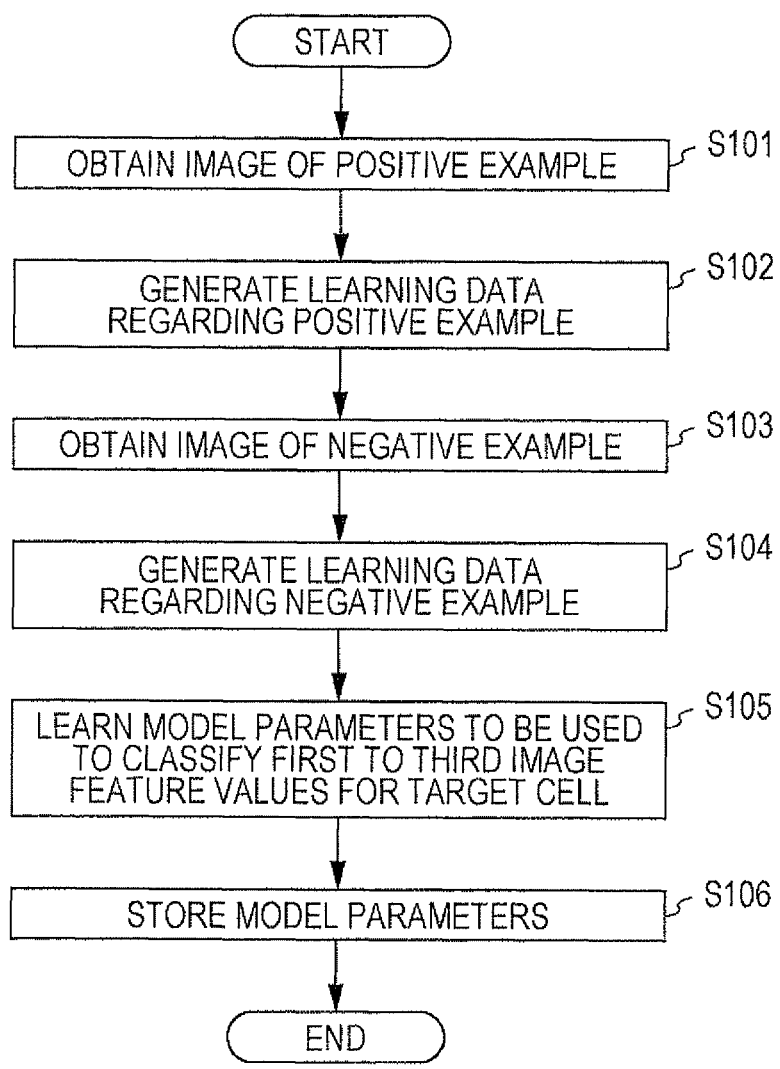

IMAGE PROCESSING APPARATUS, IMAGE PROCESSING METHOD, NON-TRANSITORY COMPUTER-READABLE MEDIUM, AND IMAGE PROCESSING SYSTEM FOR DETECTION OF TARGET CELLS USING IMAGE FEATURE DETERMINATION

CROSS-REFERENCE TO RELATED APPLICATIONS

This application is based on and claims priority under 35 USC 119 from Japanese Patent Application No. 2011-279338 filed Dec. 21, 2011.

BACKGROUND (i) Technical Field

The present invention relates to an image processing apparatus, an image processing method, a non-transitory computer-readable medium, and an image processing system.

(ii) Related Art

In the case where a diagnosis is made for a fetus before it is born, detection and utilization of a very small number of fetal nucleated red cells (NRBCs, hereinafter, referred to as "target cells") that are included in maternal blood have been performed. Because the number of NRBCs included in maternal blood is very small, visual detection of NRBCs imposes a heavy load.

SUMMARY

According to an aspect of the invention, there is provided an image processing apparatus including an obtaining unit, a first extraction unit, a second extraction unit, a setting unit, a filter setting unit, a generating unit, and a determination unit. The obtaining unit obtains a captured image of a test piece including a target cell having a nucleus. The first extraction unit extracts pixels which are candidates for the nucleus from pixels included in the captured image. The second extraction unit extracts a connected-pixel group which is a candidate for the target cell from connected-pixel groups in which adjacent pixels among the pixels extracted by the first extraction unit are connected to each other. The setting unit sets rectangular regions in the captured image. Each of the rectangular regions is a region whose center is positioned at a pixel included in the connected-pixel group extracted by the second extraction unit and which has a given size. The filter setting unit sets a filter which includes first to N-th regions and which is configured so that an i-th region does not extend outside an (i+1)-th region, where N is an integer that is equal to or larger than two and i is any integer in a range of 1 to N−1. In a case where the filter set by the filter setting unit is disposed in each of the rectangular regions set by the setting unit, the generating unit generates an image feature value on the basis of a difference between the sum of pixel values of pixels included in the odd-numbered regions of the filter and the sum of pixel values of pixels included in the even-numbered regions of the filter. The determination unit determines, on the basis of whether or not the image feature value generated by the generating unit satisfies an image-feature-value condition for the image feature value, whether or not the target cell is included in the rectangular region. The image-feature-value condition is predetermined.

BRIEF DESCRIPTION OF THE DRAWINGS

An exemplary embodiment of the present invention will be described in detail based on the following figures, wherein:

FIG. 10 includes diagrams illustrating an example of the case where the size of an internal pattern of a filter is changed;

FIG. 11 includes diagrams illustrating an example of the case where the position coordinates of an internal pattern of a filter are changed;

FIG. 13 is a flowchart of a learning process of learning image feature values, which is performed on the basis of positive and negative examples of the target cell;

DETAILED DESCRIPTION

Hereinafter, an exemplary embodiment of the present invention will be described with reference to the drawings.

Figure 1:
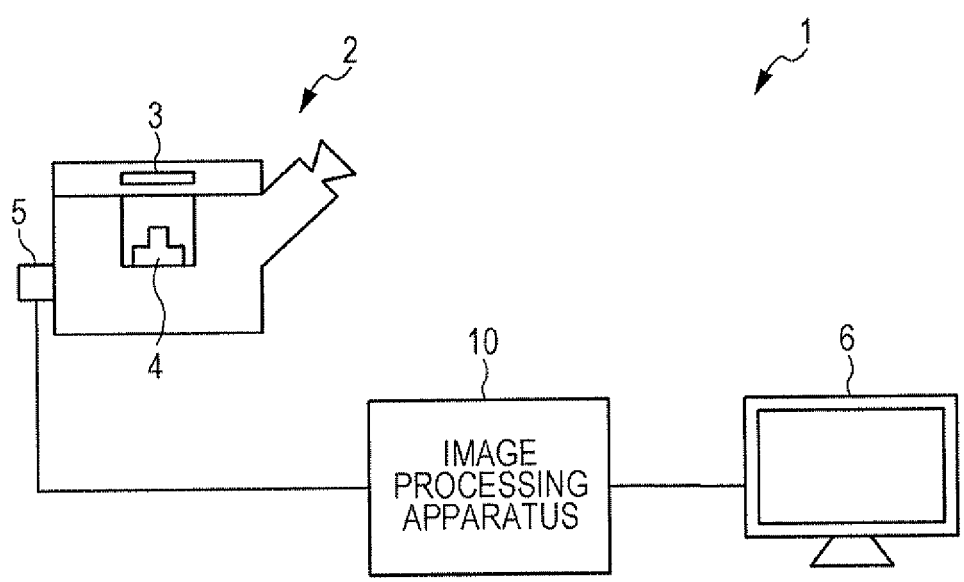
FIG. 1 is a system configuration diagram of an image processing system according to a present exemplary embodiment.

FIG. 1 is a system configuration diagram of an image processing system 1 according to a present exemplary embodiment. As illustrated in FIG. 1, the image processing system 1 includes an optical microscope 2, an image processing apparatus 10, and a display apparatus 6. The image processing apparatus 10 is connected to the optical microscope 2 and the display apparatus 6 so that data communication can be performed between the image processing apparatus 10 and each of the optical microscope 2 and the display apparatus 6.

The optical microscope 2 captures, using a charge coupled device (CCD) camera 5 via an optical system such as an objective lens 4, an image of a test piece provided on a microscope slide 3 disposed on a test-piece stage. In the present exemplary embodiment, maternal blood that has been applied to the microscope slide 3 and subjected to May-Giemsa staining is used as the test piece. Accordingly, NRBCs included in the maternal blood are stained in bluish purple. Hereinafter, each of NRBCs is referred to as a "target cell".

The image processing apparatus 10 obtains a captured image that has been captured by the optical microscope 2, and searches, for the target cell, the captured image that has been obtained. The details of a process of searching for the target cell, which is performed by the image processing apparatus 10, will be described below.

The display apparatus 6 displays a screen on the basis of a result of a process performed by the image processing apparatus 10. For example, the captured image that has been captured by the optical microscope 2, a result of the process of searching for the target cell, which has been performed by the image processing apparatus 10, or the like is displayed on the display apparatus 6.

Figure 2:
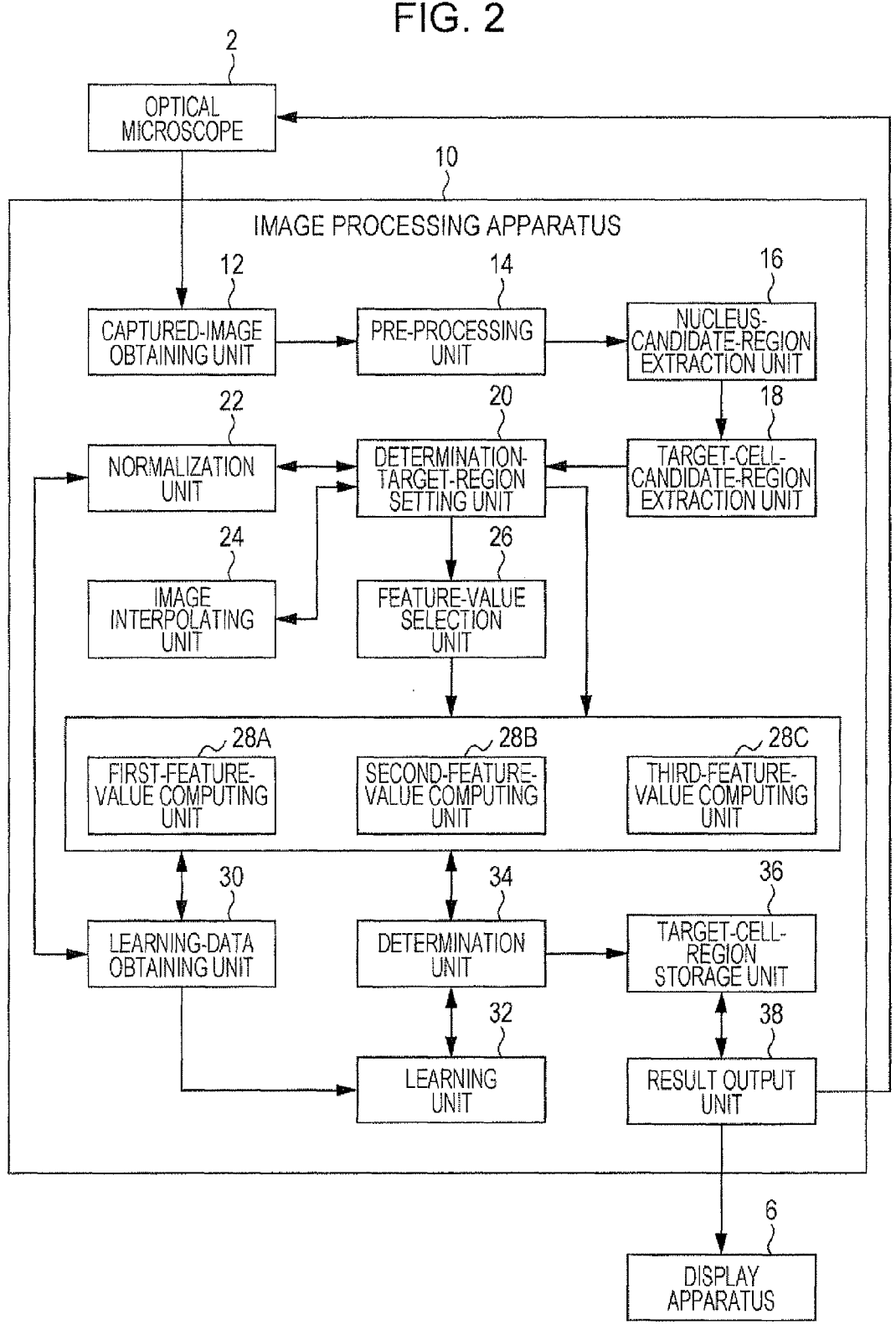
FIG. 2 is a functional block diagram of an image processing apparatus.

FIG. 2 is a functional block diagram of the image processing apparatus 10. As illustrated in FIG. 2, the image processing apparatus 10 includes a captured-image obtaining unit 12, a pre-processing unit 14, a nucleus-candidate-region extraction unit 16, a target-cell-candidate-region extraction unit 18, a determination-target-region setting unit 20, a normalization unit 22, an image interpolating unit 24, a feature-value selection unit 26, a first-feature-value computing unit 28A, a second-feature-value computing unit 28B, a third-feature-value computing unit 28C, a learning-data obtaining unit 30, a learning unit 32, a determination unit 34, a target-cell-region storage unit 36, and a result output unit 38.

Regarding the function of each of the above-mentioned units included in the image processing apparatus 10, a computer that includes, for example, a controller such as a central processing unit (CPU), a memory, and an input/output unit that transmits/receives data to/from an external device may read and execute a program stored on a computer-readable information storage medium, thereby realizing the function. Note that the program may be supplied to the image processing apparatus 10, which is a computer, using an information storage medium such as an optical disc, a magnetic disc, a magnetic tape, a magneto-optical disk, or a flash memory, or may be supplied to the image processing apparatus 10 via a data communication network such as the Internet.

An image of a test piece is captured by the CCD camera 5 included in the optical microscope 2, and the captured-image obtaining unit 12 obtains the captured image from the optical microscope 2.

Figure 3:
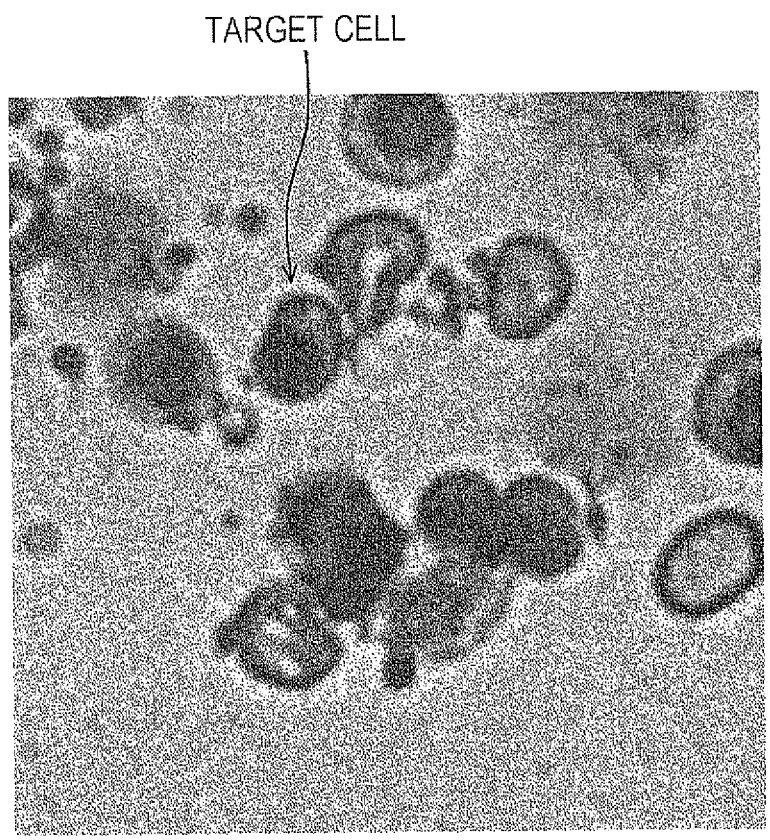
FIG. 3 is a diagram illustrating an example of a captured image, which has been captured by an optical microscope, of a test piece (maternal blood)

FIG. 3 illustrates an example of a captured image of a test piece of (maternal blood) that has been captured by the optical microscope 2 and that has been obtained by the captured-image obtaining unit 12. In the captured image illustrated in FIG. 3, cells having nuclei that have been colored in a dark color are the target cells. Note that the target cells (NRBCs) have the following four features (see Automatic Extraction of Nucleated Red Cells from Large Number of Microscopic Images, the Journal of the Institute of Image Electronics Engineers of Japan, Vol. 37, No. 5, September 2008). Regarding the first feature of NRBCs, one nucleus is present in each NRBC, the shape of the nucleus is close to a perfect circle, and the nucleus has a high density. Regarding the second feature, the nuclei of NRBCs are stained by May-Giemsa staining so that the color of the nuclei of the NRBCs is slightly darker than the color of the nuclei of other cells. Regarding the third feature, the area of each NRBC, the area of the nucleus thereof, and the ratio of the area of each NRBC to the area of the nucleus thereof fall within specific ranges. Regarding the fourth feature, the difference between the color density of the nucleus of each NRBC and the color density of the cytoplasm thereof is slightly larger than the difference between the color density of the nucleus of each of other cells and the color density of the cytoplasm thereof.

The pre-processing unit 14 performs histogram equalization, color matching using principal component analysis, or image processing such as processing using a mean filter or a median filter on the captured image obtained by the captured-image obtaining unit 12, thereby performing color normalization or noise reduction on the captured image.

The nucleus-candidate-region extraction unit 16 extracts, as nucleus candidate regions, pixels having a color or color density that is in a predetermined range, from the captured image from which noise has been removed by the pre-processing unit 14. For example, the nucleus-candidate-region extraction unit 16 may perform, on pixels included in the captured image, binarization using a threshold of a predetermined color (or color density). More specifically, the nucleus-candidate-region extraction unit 16 may extract, as black pixels, pixels having a color (or color density) that is higher than a threshold (or equal to or higher than the threshold).

Figure 4:
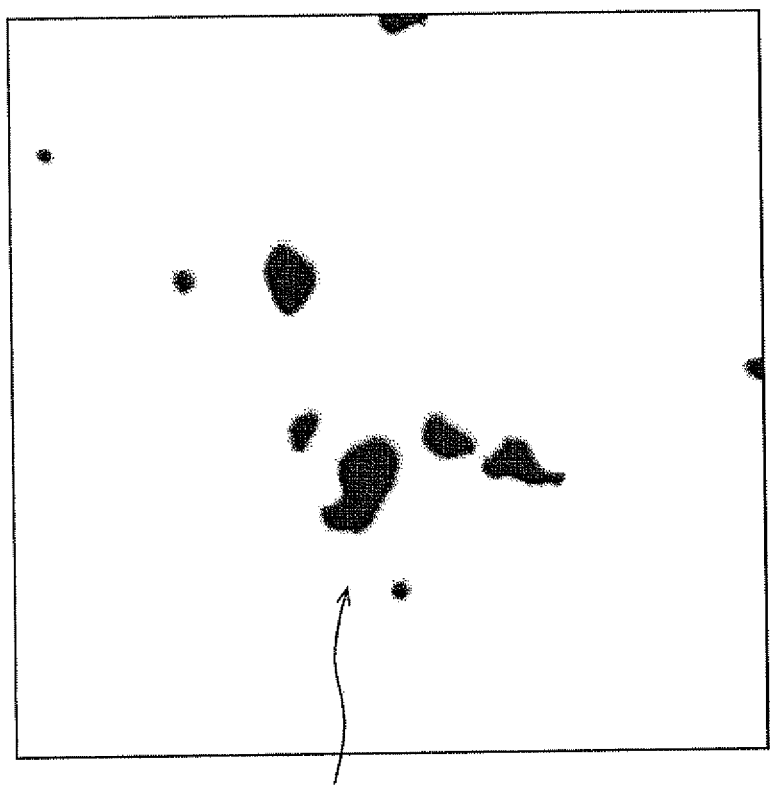
FIG. 4 is a diagram illustrating examples of pixels that are candidates for a nucleus.

FIG. 4 illustrates examples of pixels that are candidates for a nucleus and that have been extracted by the nucleus-candidate-region extraction unit 16 from the captured image illustrated in FIG. 3. As illustrated in FIG. 4, regions (pixels) that are candidates for a nucleus are extracted from the captured image by the process performed by the nucleus-candidate-region extraction unit 16.

The target-cell-candidate-region extraction unit 18 extracts, as pixel groups (target-cell candidate regions) that are candidates for the target cell, from connected-pixel groups, connected-pixel groups having sizes and shapes that satisfy predetermined conditions. The connected-pixel groups are pixel groups in which, among the pixels that have been extracted by the nucleus-candidate-region extraction unit 16 and that are candidates for a nucleus, adjacent pixels are connected to each other. For example, the target-cell-candidate-region extraction unit 18 performs labeling on connected-pixel groups in which the pixels (black pixels) that are candidates for a nucleus and that have been extracted by the nucleus-candidate-region extraction unit 16 are connected to each other (connected-pixel groups 1 to n). Each of the connected-pixel groups 1 to n is represented by a connected-pixel group i (where i is an integer in the range of 1 to n). The target-cell-candidate-region extraction unit 18 sets a bounding rectangle for the connected-pixel group i. Then, regarding the length and width of each of the bounding rectangles that have been set for the connected-pixel groups, the ratio of the length to the width of the bounding rectangle, and the black-pixel density of the bounding rectangle, the target-cell-candidate-region extraction unit 18 extracts, as candidates for the target cell, connected-pixel groups having the value of each of the length and width, the ratio, and the black-pixel density that is in a predetermined range.

Figure 5:
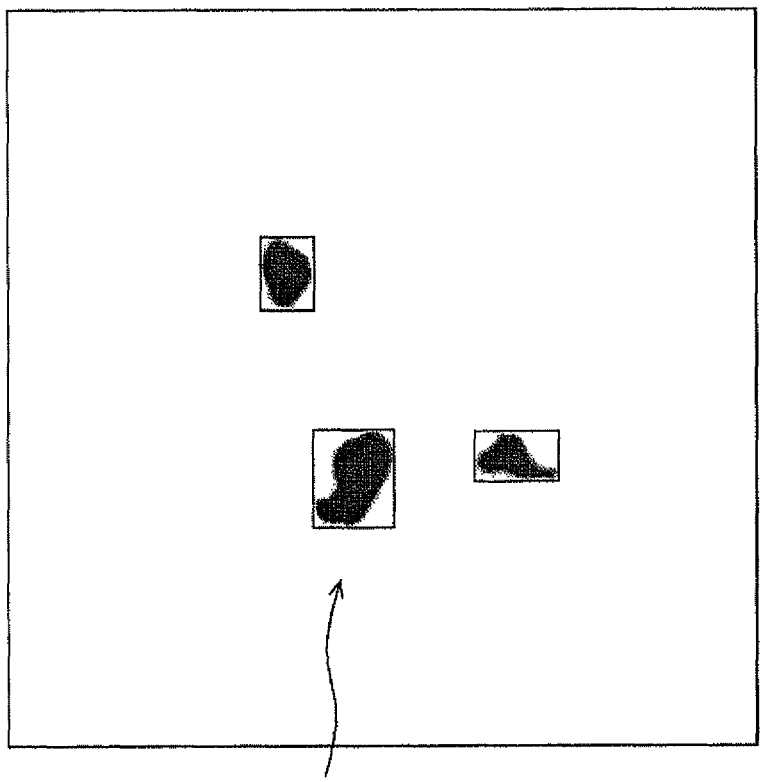
FIG. 5 is a diagram illustrating examples of pixel groups that have been extracted as candidates for a target cell.

FIG. 5 illustrates examples of pixel groups that have been extracted as candidates for the target cell from the pixels that are candidates for a nucleus and that are illustrated in FIG. 4. As illustrated in FIG. 5, image regions that each may probably be the nucleus of the target cell are extracted from the candidates for a nucleus by the process performed by the target-cell-candidate-region extraction unit 18.

For each of the rectangular regions (candidate rectangular regions) which have been set for the connected-pixel groups extracted by the target-cell-candidate-region extraction unit 18, the determination-target-region setting unit 20 sets, in the captured image, a rectangular region (a determination-target region) whose center is positioned at a pixel included in the rectangular region and which has a given size (for example, N pixels×M pixels). For example, the determination-target-region setting unit 20 selects one pixel from among pixels included in the candidate rectangular region, and determines a corresponding pixel included in the captured image on the basis of the position coordinates of the one pixel that has been selected. The determination-target region setting unit 20 sets the determination-target region whose center is positioned at the corresponding pixel that has been determined and which has a given size. Note that, the determination-target-region setting unit 20 may sequentially select pixels on a one-by-one basis from among the pixels included in the candidate rectangular region, and may set the determination-target region for each of the selected pixels.

Figure 6:
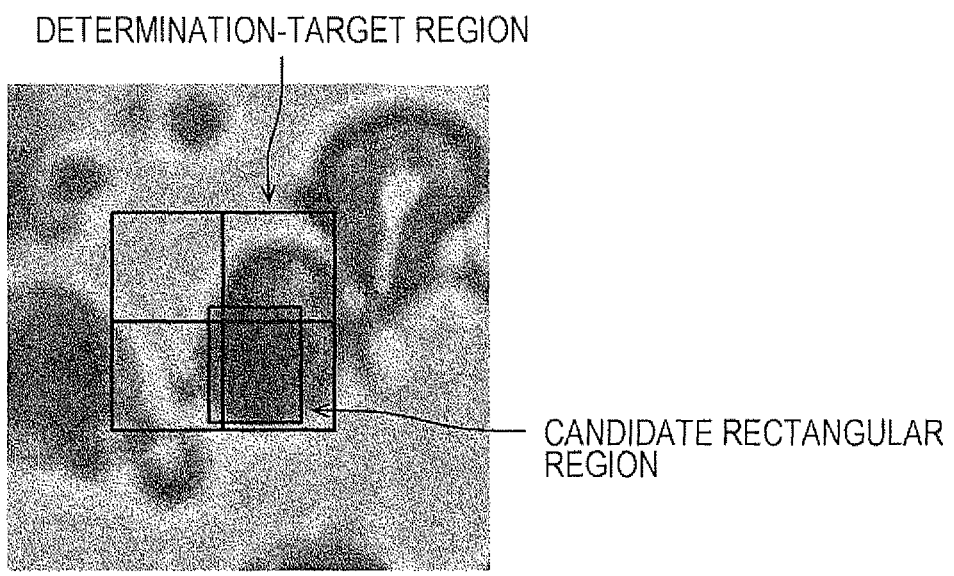
FIG. 6 is a diagram illustrating an example of a determination-target region that has been set in the captured image.

FIG. 6 illustrates an example of the determination-target region that has been set in the captured image by the determination-target-region setting unit 20. As illustrated in FIG. 6, the determination-target region whose center is positioned at one pixel included in the candidate rectangular region is set.

The normalization unit 22 performs a process of rotating an image included in the determination-target region set by the determination-target-region setting unit 20 so that the direction of the image will be oriented in a predetermined direction. For example, the normalization unit 22 obtains the position of the center of gravity of a binarized image included in the determination-target region, and computes a rotation angle that is necessary to orient, in a predetermined direction (for example, the upper direction), the direction vector that is obtained by connecting between the position of the center of the determination-target region and the obtained position of the center of gravity. Then, the normalization unit 22 rotates the image included in the determination-target region (a partial image of the captured image) by the computed rotation angle. Note that the process performed by the normalization unit 22 may not necessarily need to be performed.

Figure 7A:
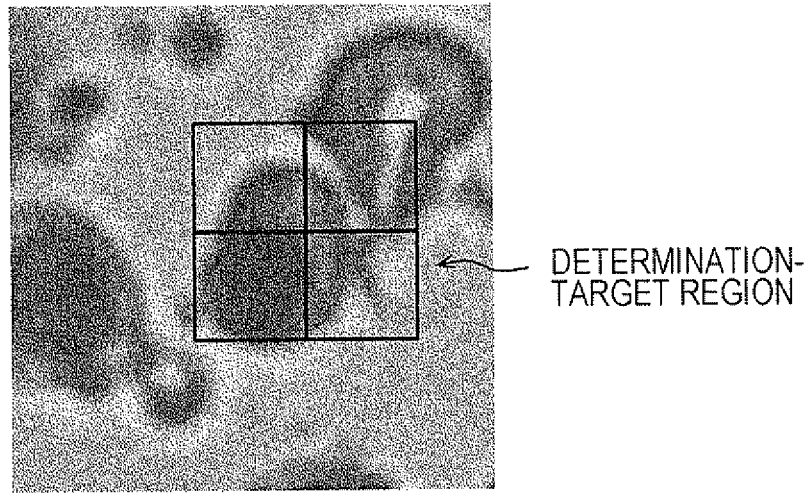
FIGS. 7A to 7C are diagrams for explaining the flow of a process performed by a normalization unit.
Figure 7B:
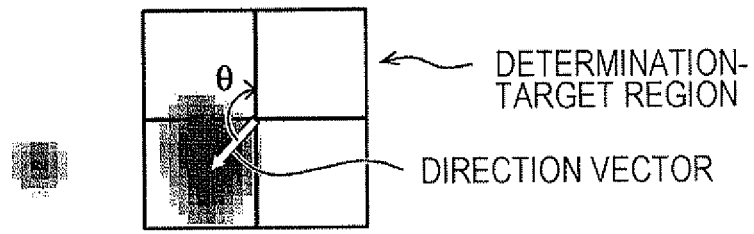
Figure 7C:
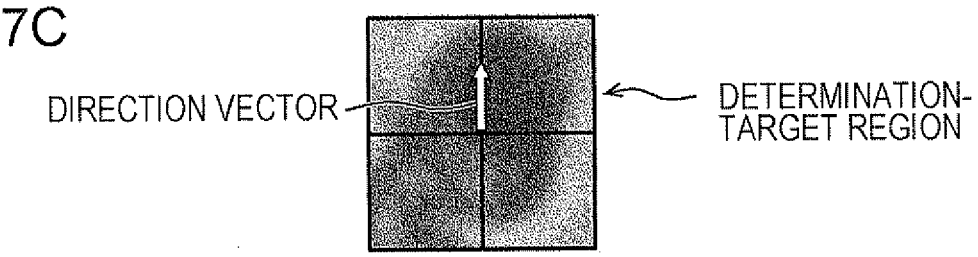

FIGS. 7A to 7C are diagrams for explaining the flow of the process performed by the normalization unit 22. FIG. 7A illustrates the determination-target region that has been set in the captured image. FIG. 7B illustrates a binarized image included in the determination-target region. FIG. 7C illustrates an image that is obtained by rotating the captured image illustrated in FIG. 7A by a rotation angle θ that is necessary to orient a direction vector illustrated in FIG. 7B in the upper direction, and by cutting the captured image corresponding to the determination-target region.

Regarding the image interpolating unit 24, when an edge of the captured image is included in the determination-target region set by the determination-target-region setting unit 20, the image interpolating unit 24 interpolates an image included in the determination-target region. For example, the image interpolating unit 24 extends the determination-target region so that the determination-target region will have a predetermined size (2M pixels×2M pixels). After that, the image interpolating unit 24 sets, as a center line, the longest line segment among line segments that are associated with binarized images included in the extended determination-target region and that are parallel to the edge of the captured image. Then, the image interpolating unit 24 calculates a distance L from the set center line to the edge of the captured image. The image interpolating unit 24 moves, in the extended determination-target region, a partial region from an edge of the determination-target region that faces the edge of the captured image with respect to the center line to a position that is symmetric with respect to the center line, thereby interpolating an image included in the determination-target region. The partial region is constituted by (M−L) pixels in the direction perpendicular to the center line and 2M pixels in the direction parallel to the center line.

Figure 8A:
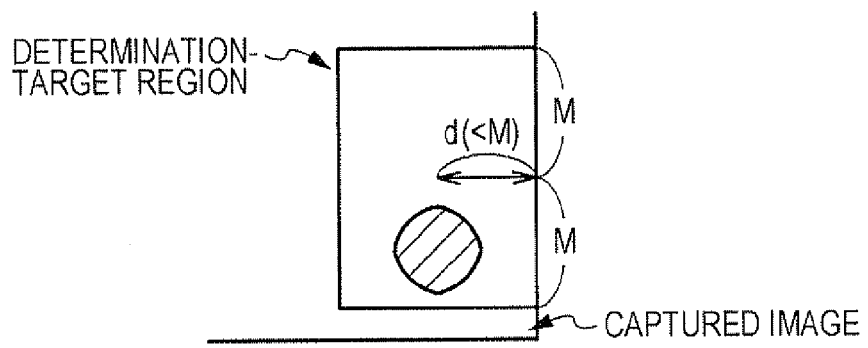
FIGS. 8A to 8D are diagrams for explaining the flow of a process performed by an image interpolating unit.
Figure 8B:
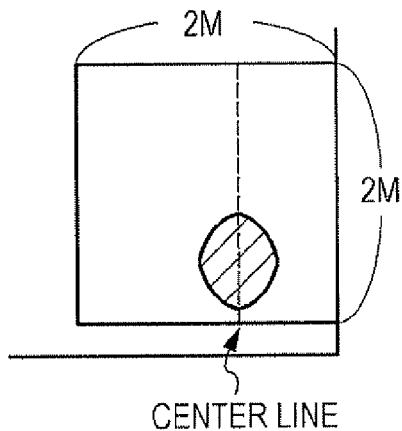
Figure 8C:
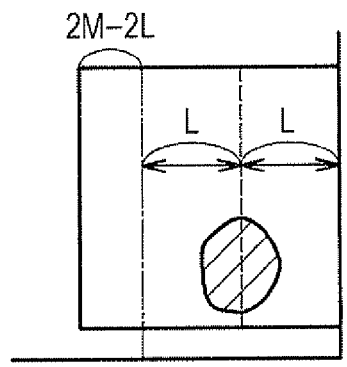
Figure 8D:
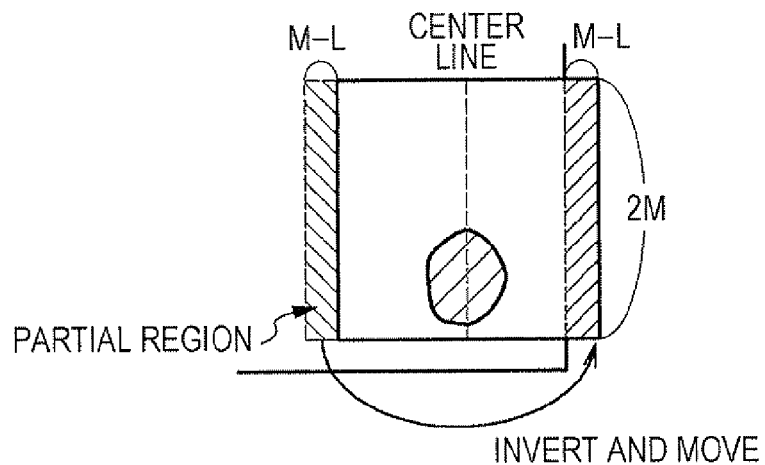

FIGS. 8A to 8D are diagrams for explaining the flow of the process performed by the image interpolating unit 24. FIG. 8A is an example of the determination-target region set by the determination-target-region setting unit 20. As illustrated in FIG. 8A, an edge of the captured image is included in the determination-target region. In this case, as illustrated in FIG. 5B, the image interpolating unit 24 extends the determination-target region so that the determination-target region will have a size of 2M pixels×2M pixels. After that, the image interpolating unit 24 sets, as a center line, the position of the longest line segment among line segments that are associated with binarized images included in the determination-target region and that are parallel to the edge of the captured image. Next, the image interpolating unit 24 calculates the distance L between the center line and the edge of the captured image (see FIG. 8C). FIG. 5D illustrates a diagram in which the image interpolating unit 24 has moved, in the extended determination-target region, a partial region from an edge of the determination-target region that faces the edge of the captured image with respect to the center line to a position that is symmetric with respect to the center line, and in which the image interpolating unit 24 has combined the partial region to the determination-target region. The partial region is constituted by (M−L) pixels in the direction perpendicular to the center line and 2M pixels in the direction parallel to the center line. Note that the partial region to be combined with the determination-target region may be inverted with respect to the center line.

The feature-value selection unit 26 selects an image feature value that is to be used in a learning process and a classification process. For example, the feature-value selection unit 26 may select at least one of first to third image feature values, which are described below. Selection of an image feature value may be performed on the basis of a user specification, or an image feature value that is to be utilized may be predetermined. Hereinafter, the details of each of the first to third image feature values will be described.

The first-feature-value computing unit 28A computes the first image feature value (a feature value based on a Haar-Like feature, hereinafter, referred to as a "Haar-Like feature value") for an image (which may be an image that has been subjected to the normalization process performed by the normalization unit or may be an image that has not been subjected to the normalization process) included in the determination-target region set by the determination-target-region setting unit 20. For example, the first-feature-value computing unit 28A may dispose Z filters (where Z is a natural number) in the determination-target region, and may generate a Z-dimensional feature vector as the first image feature value. The Z-dimensional feature vector has, as elements, Z feature values that are obtained in the case where the individual filters are disposed. Hereinafter, examples of configurations of the Z filters used by the first-feature-value computing unit 28A will be described.

In the present exemplary embodiment, the first-feature-value computing unit 28A may configure the Z filters by changing a setting (1) of basic patterns of the filters, a setting (2) of the size of an internal pattern of each of the filters, and a setting (3) of the position coordinates of an internal pattern of each of the filters.

Figure 9A:
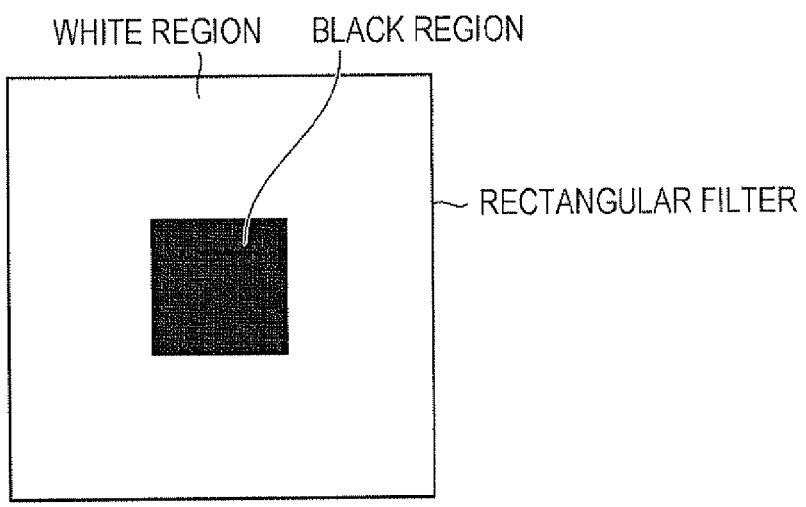
FIGS. 9A and 9B are diagrams illustrating examples of basic patterns of filters.
Figure 9B:
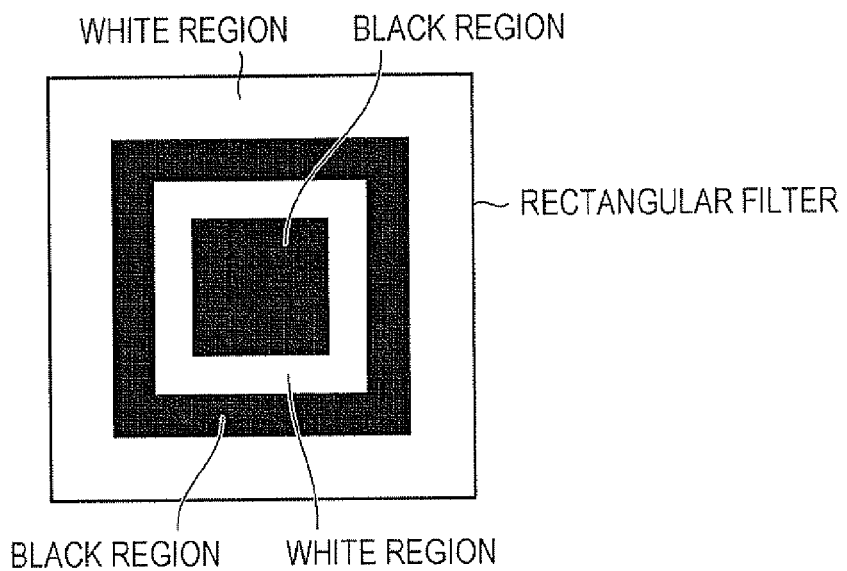

First, the setting (1) of basic patterns of the filters will be described. FIGS. 9A and 9B illustrate examples of basis patterns of the filters. In the present exemplary embodiment, as illustrated in FIGS. 9A and 93, examples of the basic patterns of the filters include a first basic pattern illustrated in FIG. 9A and a second basic pattern illustrated in FIG. 93. The first basic pattern is configured by disposing a black region inside a rectangular filter, and by disposing a white region having a rectangular-frame shape outside the black region. The second basic pattern is configured by disposing a black region inside a rectangular filter, and by alternately disposing a white region, a black region, and a white region having a rectangular-frame shape outside the black region. Note that the shapes of the basic patterns of the filters are determined in accordance with image features of the target cell illustrated in FIG. 3. The black region illustrated in FIG. 9A corresponds to a nucleus region, and the black regions illustrated in FIG. 93 correspond to a nucleus region and a cell membrane. In each of the basic patterns, regarding a black region and a white region that is adjacent to the black region, a portion of the outer edge of the black region and a portion of the outer edge of the white region may be in contact with each other.

Here, the filters may be configured by inverting each of the black regions and the white regions included in the filters illustrated in FIGS. 9A and 9B. Note that, in the present exemplary embodiment, regarding the basic patterns of the filters, examples in which a filter is configured as a rectangular filter are provided. However, each of the filters and the white regions and the black regions disposed inside the filters may have another shape, such as a polygon, the rectangle being included in examples of the polygon, or an oval shape.

Next, an example of the setting (2) of the size of an internal pattern of each of the filters will be described. The first-feature-value computing unit 28A calculates a ratio ($\alpha$) of the size of each of the nucleus candidate regions extracted by the nucleus-candidate-region extraction unit 16 to the size of the corresponding determination-target region set by the determination-target-region setting unit 20 for the nucleus candidate region. The first-feature-value computing unit 28A sets a range (from $\beta$ to $\gamma$) of the ratio of the size of a black region disposed inside a rectangular filter to the size of the rectangular filter on the basis of the calculated ratio ($\alpha$). For example, supposing that a is a coefficient which is equal to or smaller than 1 and b is a coefficient which is larger than 1, $\beta$ and $\gamma$ may be calculated using equations $\beta = a \cdot \alpha$ and $\gamma = b \cdot \alpha$. For example, it may be supposed that an equation $a/b = 1/10$ is satisfied. Note that the ratio of a size to a size may be a ratio between areas or a ratio between lengths of sides of a rectangle.

FIG. 10 illustrates an example of the case where the size of an internal pattern of a rectangular filter is changed. As illustrated in FIG. 10, when it is supposed that the length of one side of the rectangular filter is 1, the length of one side of a black region may be changed in the range of $1/\gamma$ to $1/\beta$. The sizes of the outer circumference and the inner circumference of a black region that is disposed outside the black region positioned at the center may be set in the range of $1/\beta$ to 1.

Next, an example of the setting (3) of the position coordinates of an internal pattern of each of the filters will be described. The first-feature-value computing unit 28A may configure a rectangular filter by changing the position coordinates of a black region, which is disposed inside the rectangular filter, so that the black region does not extend outside the rectangular filter. Here, FIG. 11 illustrates an example of the case where the position coordinates of an internal pattern of a filter are changed. Note that, regarding a black region provided inside a filter, the black region may be disposed so that the position of the black region is changed, at predetermined intervals, from an edge of a region in which the black region can be disposed, or may be disposed at a predetermined position (for example, centered, left-aligned, or right-aligned) in the region in which the black region can be disposed.

The first-feature-value computing unit 28A generates different Z filters (each of the Z filters being denoted by Fi where i is an integer in the range of 1 to Z) that have configurations in which at least one of the settings (1) to (3) described above has been changed. Additionally, when the first-feature-value computing unit 28A disposes the generated filter (Fi) in the determination-target region, the first-feature-value computing unit 28A calculates the sum (Si) of pixel values of individual pixels that are included in the determination-target region and that are included in the black regions of the filters, and the sum (Ti) of pixel values of individual pixels that are included in the determination-target region and that are included in the white regions of the filters. The first-feature-value computing unit 28A calculates the difference between the sum Si and the sum Ti, which have been calculated, as an element feature value Ci (represented by an equation $C_i = S_i - T_i$). Then, the first-feature-value computing unit 28A calculates C (constituted by $C_1, C_2, \ldots,$ and $C_z$) as the first image feature value (the Haar-Like feature value) for the determination-target region on the basis of the element feature value Ci that has been calculated for the filter Fi which is each of the Z filters.

The second-feature-value computing unit 28B computes the second image feature value for an image (which may be an image that has been subjected to the normalization process performed by the normalization unit or may be an image that has not been subjected to the normalization process) included in the determination-target region set by the determination-target-region setting unit 20. For example, as the second image feature value, a feature value based on histograms of oriented gradients (HOG) (hereinafter, referred to as an "HOG feature value") may be used, or another value may be used.

Figure 12A:
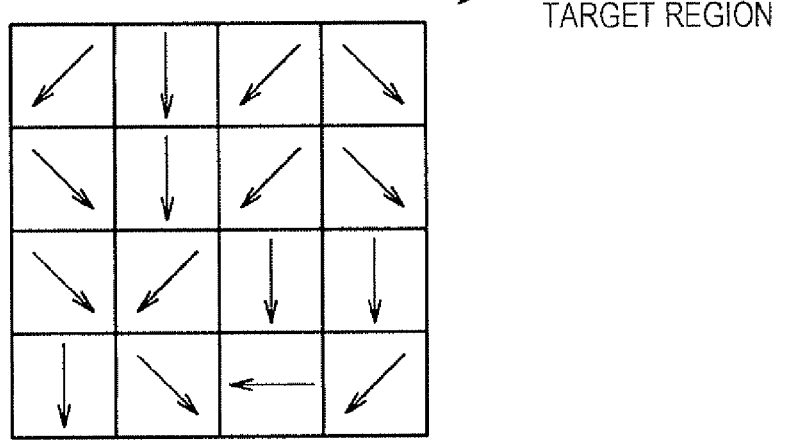
FIGS. 12A and 12B are diagrams for explaining a feature value based on histograms of oriented gradients (HOG)
Figure 12B:
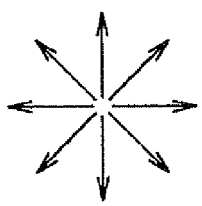

FIGS. 12A and 12B are diagrams for explaining an HOG feature value that is computed by the second-feature-value computing unit 28B. As illustrated in FIG. 12A, the determination-target region is divided into a predetermined number (for example, 4×4) of partial regions. An intensity gradient direction at each of pixels included in each of the partial regions is calculated. A histogram of the calculated intensity gradient directions is calculated for each of the partial regions. The histograms calculated for the partial regions are combined with each other, thereby obtaining an HOG feature value. As illustrated in FIG. 12B, the intensity gradient directions may be, for example, eight directions (the upper direction, the upper-right direction, the lower-right direction, the right direction, the lower direction, the lower-left direction, the left direction, and the upper-left direction). Note that, without calculating the histograms for the individual partial regions, the intensity gradient directions that have been calculated for the individual partial regions may be combined with each other, thereby generating the second image feature value. Here, a filter such as a Gabor filer may be used to calculate the intensity gradient directions for the individual partial regions.

The third-feature-value computing unit 28C computes the third image feature value for an image (which may be an image that has been subjected to the normalization process performed by the normalization unit or may be an image that has not been subjected to the normalization process) included in the determination-target region set by the determination-target-region setting unit 20. For example, the third image feature value may be generated by combining the first image feature value (the Haar-Like feature value) and the second image feature value (the HOG feature value). More specifically, a vector (a vector constituted by $Z_1 + Z_2$ elements) that includes the elements of the first image feature value ($Z_1$ elements) and the elements of the second image feature value ($Z_2$ elements) may be generated as the third image feature value.

The learning-data obtaining unit 30 obtains sample images of a positive example and a negative example of the target cell, and obtains the first to third image feature values for each of the obtained positive and negative examples. For example, the learning-data obtaining unit 30 may compute, for each of the sample images, using each of the first-feature-value computing unit 28A, the second-feature-value computing unit 28B, and the third-feature-value computing unit 28C, a corresponding one of the image feature values to obtain results of computation. Alternatively, the learning-data obtaining unit 30 may obtain first to third image feature values that are computed in advance.

The learning unit 32 learns conditions (criteria), which are to be used to classify the first to third image feature values in order to distinguish the target cell from others, for the first to third image feature values on the basis of the first to third image feature values that have been obtained by the learning-data obtaining unit 30 for the individual positive and negative examples. Note that the learning process may be performed using a learning algorithm such as Support Vector Machine or AdaBoost. For example, when Support Vector Machine is used for the learning process, the condition for each of the image feature values that is to be learned is represented by a hyperplane by which image feature values that match the target cell and image feature values that do not match the target cell are separated from each other. Note that the learning unit 32 learns a first classifier on the basis of the first image feature values for the individual positive and negative examples, learns a second classifier on the basis of the second image feature values for the individual positive and negative examples, and learns a third classifier on the basis of the third image feature values for the individual positive and negative examples.

The determination unit 34 determines whether or not an image included in the determination-target region represents the target cell, on the basis of whether or not the first to third image feature values calculated by the first-feature-value computing unit 28A, the second-feature-value computing unit 28B, and the third-feature-value computing unit 28C satisfy the conditions, which have been learned by the learning unit 32 and which are used to classify the first to third image feature values in order to distinguish the target cell from others, for the first to third image feature values. Hereinafter, specific examples of the process performed by the determination unit 34 will be described. Which of determination criteria described below will be employed may be predetermined, or may be determined by accepting a selection made by a user.

In the first example, the determination unit 34 determines whether or not an image included in the determination-target region represents the target cell, on the basis of whether or not the first image feature value calculated for the determination-target region satisfies the condition, which has been learned by the learning unit 32 and which is used to classify the first image feature value in order to distinguish the target cell from others, for the first image feature value.

In the second example, the determination unit 34 determines whether or not an image included in the determination-target region represents the target cell, on the basis of whether or not the second image feature value calculated for the determination-target region satisfies the condition, which has been learned by the learning unit 32 and which is used to classify the second image feature value in order to distinguish the target cell from others, for the second image feature value.

In the third example, the determination unit 34 determines whether or not an image included in the determination-target region represents the target cell, on the basis of whether or not the third image feature value calculated for the determination-target region satisfies the condition, which has been learned by the learning unit 32 and which is used to classify the third image feature value in order to distinguish the target cell from others, for the third image feature value.

In the fourth example, the determination unit 34 determines whether or not an image included in the determination-target region represents the target cell, on the basis of whether or not both of the first and second image feature values calculated for the determination-target region satisfy the corresponding conditions, which have been learned by the learning unit 32 and which are used to classify the first and second image feature values in order to distinguish the target cell from others, for the first and second image feature values.

In the fifth example, the determination unit 34 determines whether or not an image included in the determination-target region represents the target cell, on the basis of whether or not either one of the first and second image feature values calculated for the determination-target region satisfies a corresponding one of the conditions, which have been learned by the learning unit 32 and which are used to classify the first and second image feature values in order to distinguish the target cell from others, for the first and second image feature values.

The target-cell-region storage unit 36 stores a coordinate range that is included in the captured image and that corresponds to the determination-target region which has been determined by the determination unit 34 to be a region including the target cell. Note that the target-cell-region storage unit 36 may store, as a region in which the target cell is present, a portion in which multiple determination-target regions that have been determined to be regions including the target cell overlap each other.

The result output unit 38 outputs a result based on the coordinate range that is included in the captured image and that is stored in the target-cell-region storage unit 36. For example, the result output unit 38 may perform a process of causing the display apparatus 6 to display an image corresponding the coordinate range that is included in the captured image and that is stored in the target-cell-region storage unit 36, or may perform a process of moving the image-capture position of the optical microscope 2 to the coordinate range.

Next, examples of the flows of the processes performed by the image processing apparatus 10 will be sequentially described with reference to flowcharts of FIGS. 13, 14, 15A to 15C, and 16.

FIG. 13 is a flowchart of the learning process of learning image feature values, which is performed on the basis of the positive and negative examples of the target cell.

The image processing apparatus 10 obtains an image of the positive example of the target cell (S101). The image processing apparatus 10 calculates each of the first to third image feature values from the obtained image of the positive example, and generates learning data regarding the positive example (S102).

Next, the image processing apparatus 10 obtains an image of the negative example of the target cell (S103). The image processing apparatus 10 calculates each of the first to third image feature values from the obtained image of the negative example, and generates learning data regarding the negative example (S104).

The image processing apparatus 10 learns the individual states (model parameters) of the first to third classifiers that classify the individual first to third image feature values for the target cell on the basis of the leaning data regarding the positive example (the first to third image feature values) and the leaning data regarding the negative example (the first to third image feature values) (S105). The image processing apparatus 10 stores the learned model parameters (S106), and finishes the leaning process.

Next, the process of searching, for the target cell, the captured image, which has been captured by the optical microscope 2, of a test piece (maternal blood) will be described with reference to the flowcharts of FIGS. 14 and 15A to 15C.

Figure 14:
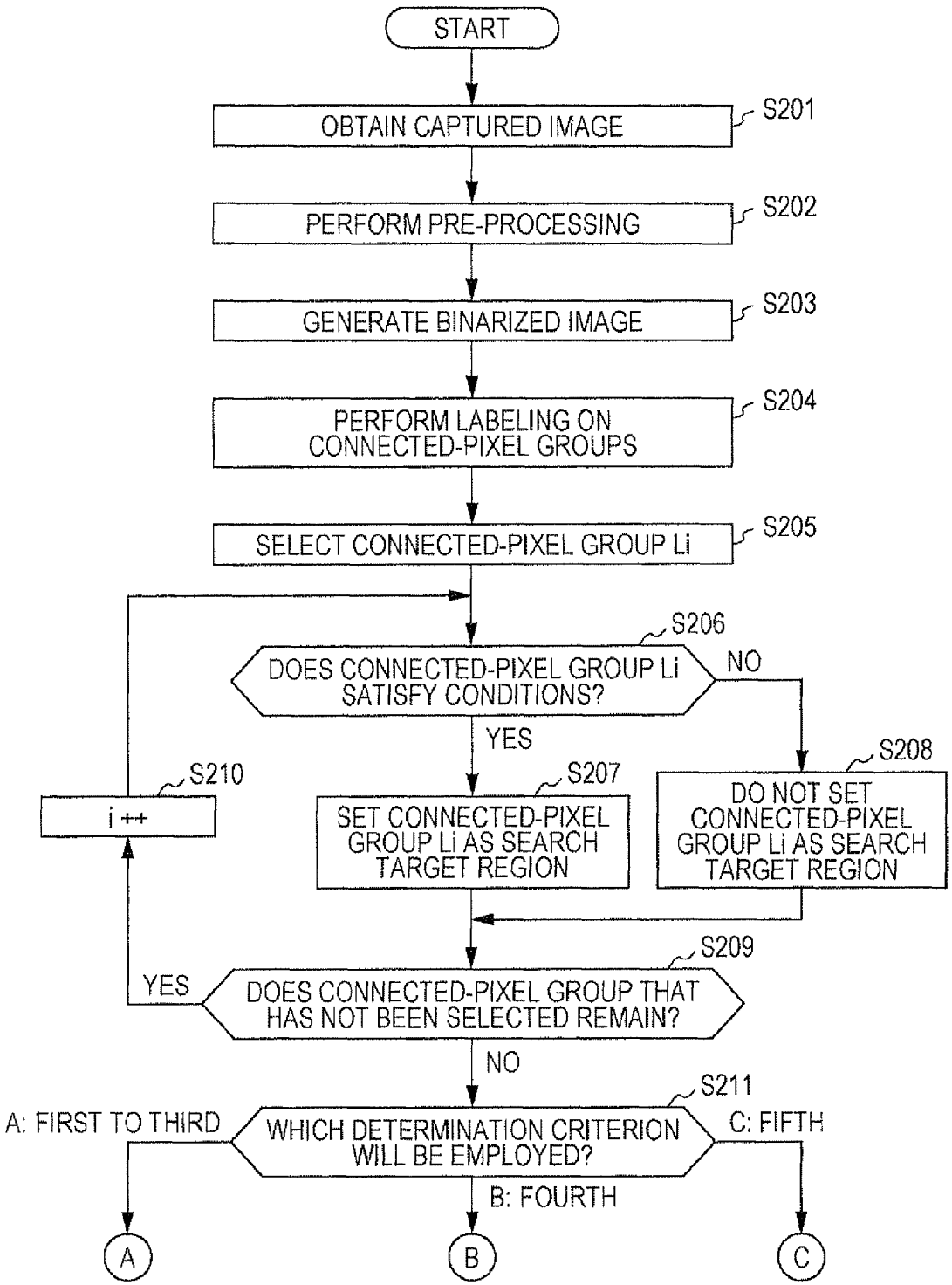
FIG. 14 is a flowchart of a process of searching, for the target cell, a captured image of a test piece (maternal blood) that has been captured by the optical microscope.

As illustrated in FIG. 14, the image processing apparatus 10 obtains a captured image, which has been captured by the optical microscope 2, of maternal blood (S201). The image processing apparatus 10 performs pre-processing, such as processing using a median filter, on the captured image that has been obtained (S202). Then, the image processing apparatus 10 generates, for the captured image that has been subjected to pre-processing, a binarized image in which pixels having a color (for example, an RGB value) that is in a predetermined range are 1 (black pixels) and the other pixels are 0 (white pixels) (S203). Here, the black pixels included in the binarized image represent nucleus candidate regions.

The image processing apparatus 10 generates connected-pixel groups by connecting adjacent pixels with each other among the black pixels included in the binarized image, and performs labeling on the connected-pixel groups (S204).

The image processing apparatus 10 selects one of the connected-pixel groups that have been subjected to labeling (S205, where the connected-pixel group which has been selected here is denoted by Li and the initial value of i is 1). The image processing apparatus 10 determines whether or not the size and shape of a bounding rectangle that is set for the connected-pixel group Li satisfy conditions that should be satisfied by the bounding rectangle of a connected-pixel group which is a candidate for the target cell (S206). When, in S206, it is determined that the size and shape of the bounding rectangle satisfy the conditions (YES in S206), the image processing apparatus 10 sets the connected-pixel group Li as a search target region for the target cell (S207). When, in S206, it is determined that the size and shape of the bounding rectangle do not satisfy the conditions (NO in S206), the image processing apparatus 10 does not set the connected-pixel group Li as a search target region for the target cell (S208). When, among the connected-pixel groups, a connected-pixel group that has not been selected remains (YES in S209), the image processing apparatus 10 increments i (S210), and returns to S206. Furthermore, when no connected-pixel group that has not been selected remains (NO in S209), in the case where the determination criteria according to the first to third examples are employed (A in S211), the image processing apparatus 10 proceeds to A (the flow illustrated in FIG. 15A). In the case where the determination criterion according to the fourth example is employed (B in S211), the image processing apparatus 10 proceeds to B (the flow illustrated in FIG. 15B). In the case where the determination criterion according to the fifth example is employed (C in S211), the image processing apparatus 10 proceeds to C (the flow illustrated in FIG. 15C). Hereinafter, the flows illustrated in FIGS. 15A to 15C will be sequentially described.

First, the flow illustrated in FIG. 15A will be described.

Figure 15A:
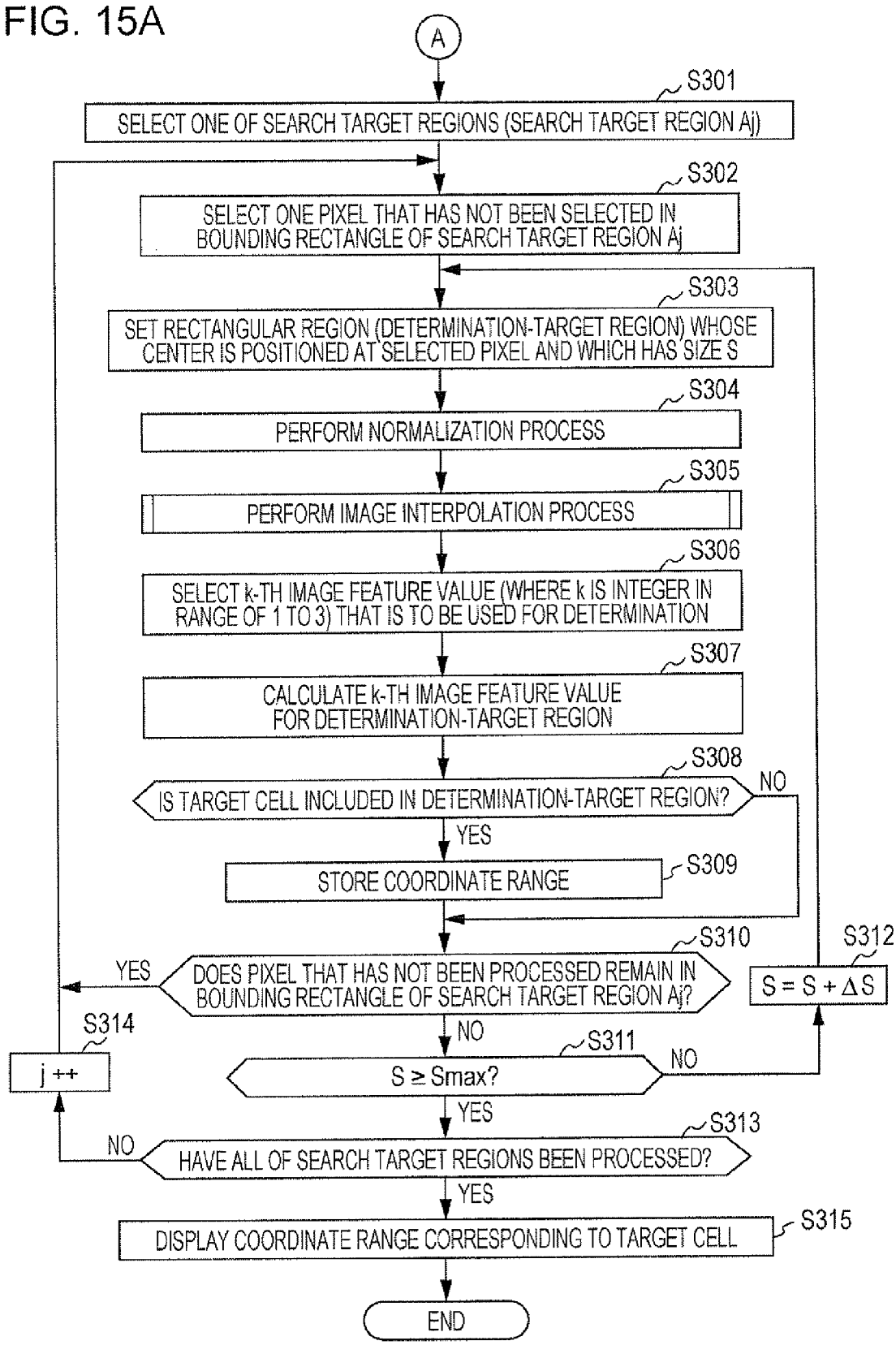
FIG. 15A is a flowchart of a process of searching, for the target cell, a captured image of a test piece (maternal blood) that has been captured by the optical microscope.

As illustrated in FIG. 15A, the image processing apparatus 10 selects one of the search target regions (denoted by A1 to Am) that have been set (S301, where the search target region which has been selected here is denoted by Aj and the initial value of j is 1). After that, the image processing apparatus 10 selects one pixel that has not been selected among pixels included in the bounding rectangle of the search target region Aj (S302). Then, the image processing apparatus 10 sets, in the captured image, a rectangular region (the determination-target region having a size S where the initial value of the size S is Smin) whose center is positioned at the selected pixel and which has a given size (S303). The image processing apparatus 10 normalizes the direction of an image corresponding to the determination-target region that has been set (S304). When the distance from the center of the determination-target region to an edge of the captured image is shorter than a threshold (i.e., when the determination-target region is cut at the edge of the captured image), the image processing apparatus 10 performs an image interpolation process (S305). The details of the flow of the image interpolation process will be described below.

After the above-mentioned process is performed, the image processing apparatus 10 selects one of the first to third image feature values, which is to be used for determination (S306). Here, the selected image feature value is denoted by a k-th image feature value (where k is an integer in the range of 1 to 3), and the description continues.

After the above-mentioned process is performed, the image processing apparatus 10 calculates the k-th image feature value for an image included in the determination-target region that has been set (S307). The image processing apparatus 10 determines whether or not the target cell is included in the determination-target region, on the basis of the calculated k-th image feature value and the model parameter, which is learned in advance, of the k classifier that classifies the k-th image feature value for the target cell (S308). When it is determined that the target cell is included in the determination-target region (YES in S308), the image processing apparatus 10 stores a coordinate range that is included in the captured image and that corresponds to the determination-target region (S309). After S309 or when it is determined that the target cell is not included in the determination-target region (NO in S308), in the case where a pixel that has not been processed among the pixels included in the bounding rectangle of the search target region Aj remains (YES in S310), the image processing apparatus 10 returns to S302. In the case where no pixel that has not been processed remains (NO in S310), the image processing apparatus 10 determines whether or not the size S of the determination-target region has reached Smax (>Smin) (S311). When the size S of the determination-target region has not reached Smax (NO in S311), the size S is increased by ΔS (S312), and the image processing apparatus 10 returns to S303. When the size S of the determination-target region has reached Smax (YES in S311), the image processing apparatus 10 proceeds to S313.

When all of the search target regions have not been processed (NO in S313), the image processing apparatus 10 increments j of the search target region Aj (S314), and returns to S302. When all of the search target regions have been processed (YES in S313), the image processing apparatus 10 displays a coordinate range that is included in the captured image and that has been determined to be a range including the target cell (S315), and finishes the process.

Figure 15B:
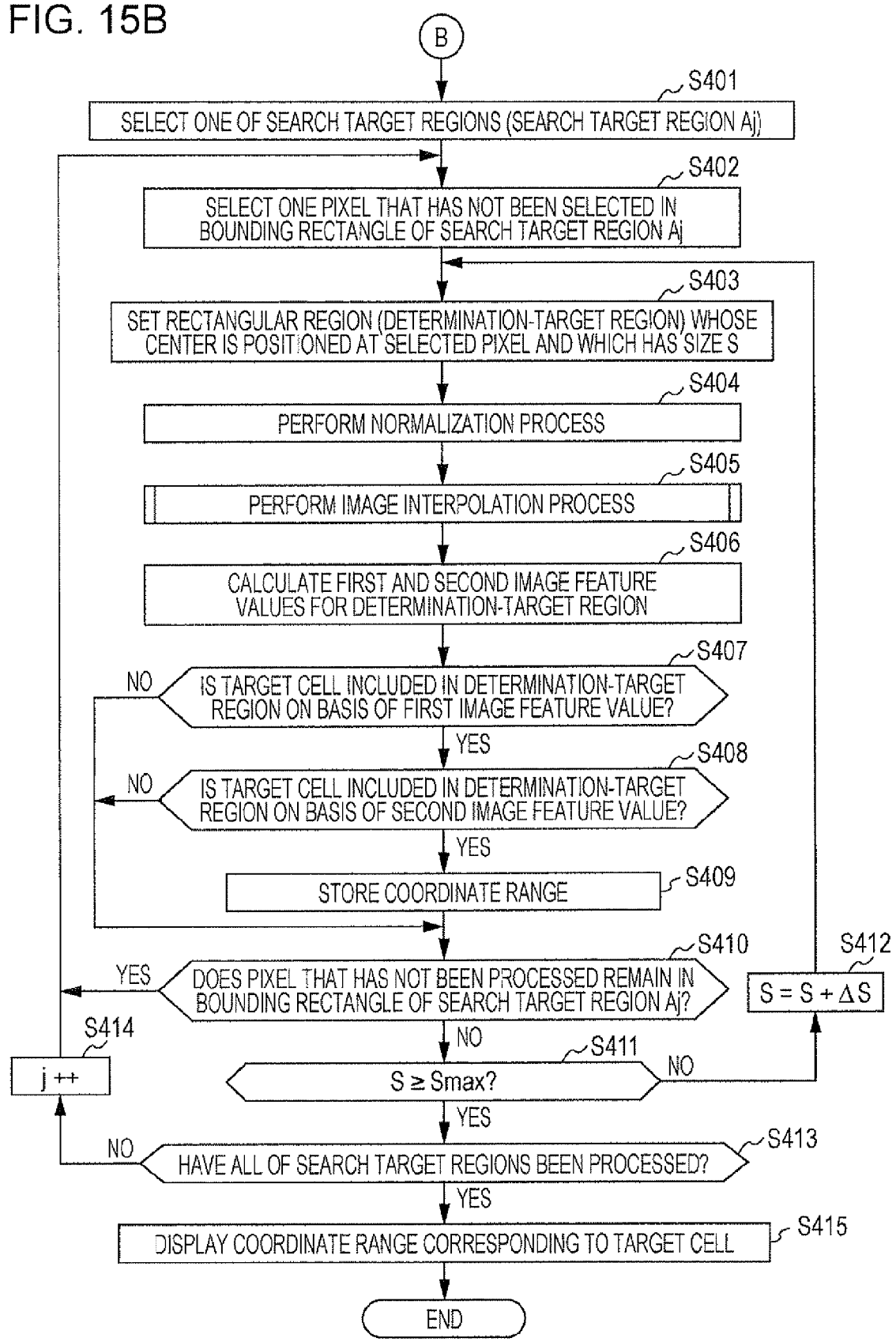
FIG. 15B is a flowchart of a process of searching, for the target cell, a captured image of a test piece (maternal blood) that has been captured by the optical microscope.

Next, the flow illustrated in FIG. 15B will be described.

As illustrated in FIG. 15E, the image processing apparatus 10 selects one of the search target regions (denoted by A1 to Am) that have been set (S401, the search target region which has been selected here is denoted by Aj and the initial value of j is 1). After that, the image processing apparatus 10 selects one pixel that has not been selected among pixels included in the bounding rectangle of the search target region Aj (S402). Then, the image processing apparatus 10 sets, in the captured image, a rectangular region (the determination-target region having a size S where the initial value of the size S is Smin) whose center is positioned at the selected pixel and which has a given size (S403). The image processing apparatus 10 normalizes the direction of an image corresponding to the determination-target region that has been set (S404). When the distance from the center of the determination-target region to an edge of the captured image is shorter than a threshold (i.e., when the determination-target region is cut at the edge of the captured image), the image processing apparatus 10 performs the image interpolation process (S405). The details of the flow of the image interpolation process will be described below.

After the above-mentioned process is performed, the image processing apparatus 10 calculates the first and second image feature values for an image included in the determination-target region that has been set (S406). Then, the image processing apparatus 10 determines whether or not the target cell is included in the determination-target region, on the basis of the calculated first image feature value and the model parameter, which is learned in advance, of the first classifier that classifies the first image feature value for the target cell (S407). When it is determined that the target cell is included in the determination-target region (YES in S407), the image processing apparatus 10 determines whether or not the target cell is included in the determination-target region, on the basis of the calculated second image feature value and the model parameter, which is learned in advance, of the second classifier that classifies the second image feature value for the target cell (S408).

When it is determined in S408 that the target cell is included in the determination-target region (YES in S408), the image processing apparatus 10 stores a coordinate range that is included in the captured image and that corresponds to the determination-target region (S409). After S409 or when it is determined in S407 or S408 that the target cell is not included in the determination-target region (NO in S407 or NO in S408), in the case where a pixel that has not been processed among the pixels included in the bounding rectangle of the search target region Aj remains (YES in S410), the image processing apparatus 10 returns to S402. In the case where no pixel that has not been processed remains (NO in S410), the image processing apparatus 10 determines whether or not the size S of the determination-target region has reached Smax (>Smin) (S411). When the size S of the determination-target region has not reached Smax (NO in S411), the size S is increased by ΔS (S412), and the image processing apparatus 10 returns to S403. When the size S of the determination-target region has reached Smax (YES in S411), the image processing apparatus 10 proceeds to S413.

When all of the search target regions have not been processed (NO in S413), the image processing apparatus 10 increments j of the search target region Aj (S414), and returns to S402. When all of the search target regions have been processed (YES in S413), the image processing apparatus 10 displays a coordinate range that is included in the captured image and that has been determined to be a range including the target cell (S415), and finishes the process.

Finally, the flow illustrated in FIG. 15C will be described.

Figure 15C:
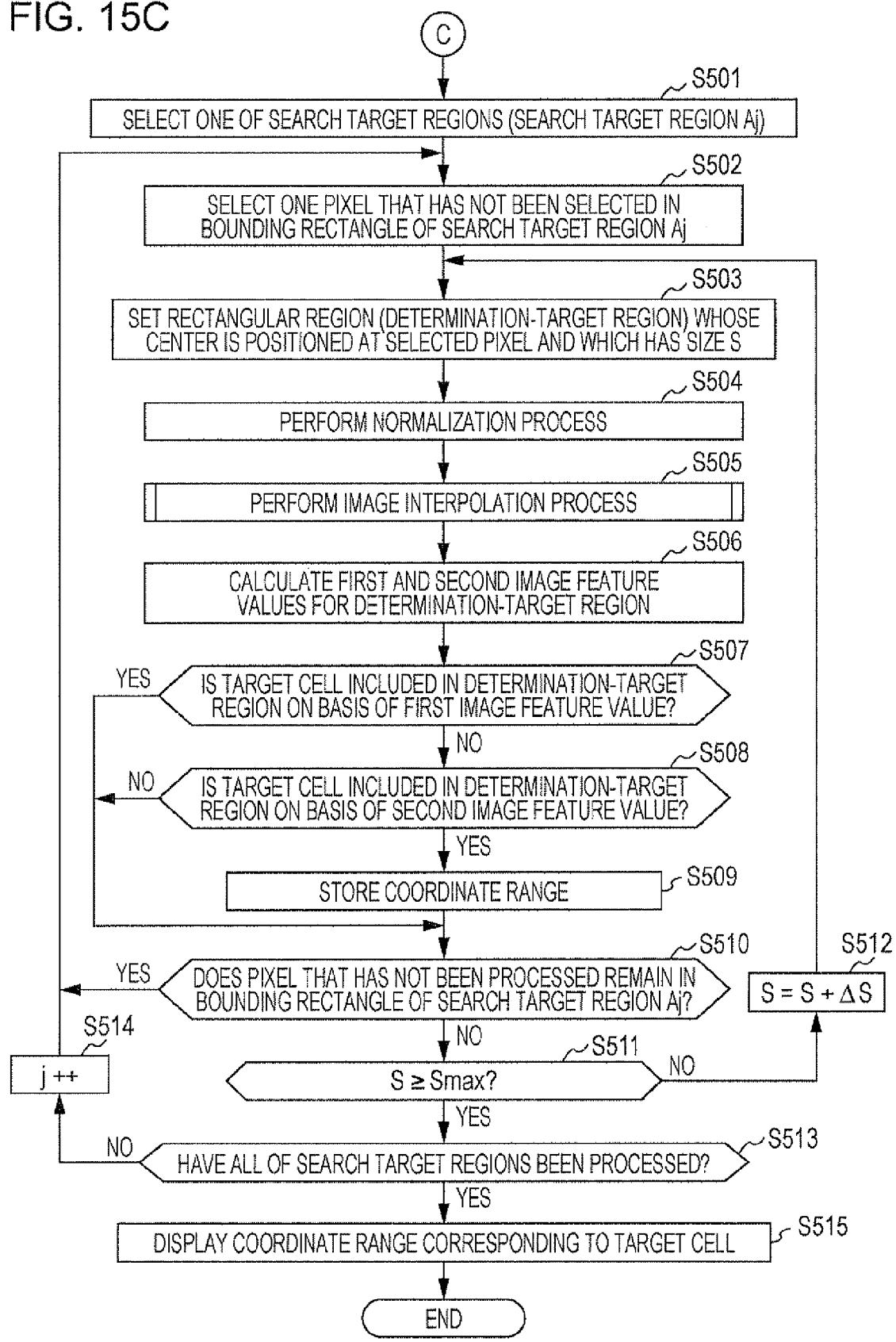
FIG. 15C is a flowchart of a process of searching, for the target cell, a captured image of a test piece (maternal blood) that has been captured by the optical microscope.

As illustrated in FIG. 15C, the image processing apparatus 10 selects one of the search target regions (denoted by A1 to Am) that have been set (S501, the search target region which has been selected here is denoted by Aj and the initial value of j is 1). After that, the image processing apparatus 10 selects one pixel that has not been selected among pixels included in the bounding rectangle of the search target region Aj (S502). Then, the image processing apparatus 10 sets, in the captured image, a rectangular region (the determination-target region having a size S whose initial value of the size S is Smin) whose center is positioned at the selected pixel and which has a given size (S503). The image processing apparatus 10 normalizes the direction of an image corresponding to the determination-target region that has been set (S504). When the distance from the center of the determination-target region to an edge of the captured image is shorter than a threshold (i.e., when the determination-target region is cut at the edge of the captured image), the image processing apparatus 10 performs the image interpolation process (S505). The details of the flow of the image interpolation process will be described below.

After the above-mentioned process is performed, the image processing apparatus 10 calculates the first and second image feature values for an image included in the determination-target region that has been set (S506). Then, the image processing apparatus 10 determines whether or not the target cell is included in the determination-target region, on the basis of the calculated first image feature value and the model parameter, which is learned in advance, of the first classifier that classifies the first image feature value for the target cell (S507). When it is determined that the target cell is not included in the determination-target region (NO in S507), the image processing apparatus 10 determines whether or not the target cell is included in the determination-target region, on the basis of the calculated second image feature value and the model parameter, which is learned in advance, of the second classifier that classifies the second image feature value for the target cell (S508).

When it is determined in S507 or S508 that the target cell is included in the determination-target region (YES in S508 or YES in S508), the image processing apparatus 10 stores a coordinate range that is included in the captured image and that corresponds to the determination-target region (S509). After S509 or when it is determined in S508 that the target cell is not included in the determination-target region (NO in S508), in the case where a pixel that has not been processed among the pixels included in the bounding rectangle of the search target region Aj remains (YES in S510), the image processing apparatus 10 returns to S502. In the case where no pixel that has not been processed remains (NO in S510), the image processing apparatus 10 determines whether or not the size S of the determination-target region has reached Smax (>Smin) (S511). When the size S of the determination-target region has not reached Smax (NO in S511), the size S is increased by ΔS (S512), and the image processing apparatus 10 returns to S503. When the size S of the determination-target region has reached Smax (YES in S511), the image processing apparatus 10 proceeds to S513.

When all of the search target regions have not been processed (NO in S513), the image processing apparatus 10 increments j of the search target region Aj (S514), and returns to S502. When all of the search target regions have been processed (YES in S513), the image processing apparatus 10 displays a coordinate range that is included in the captured image and that has been determined to be a range including the target cell (S515), and finishes the process.

Figure 16:
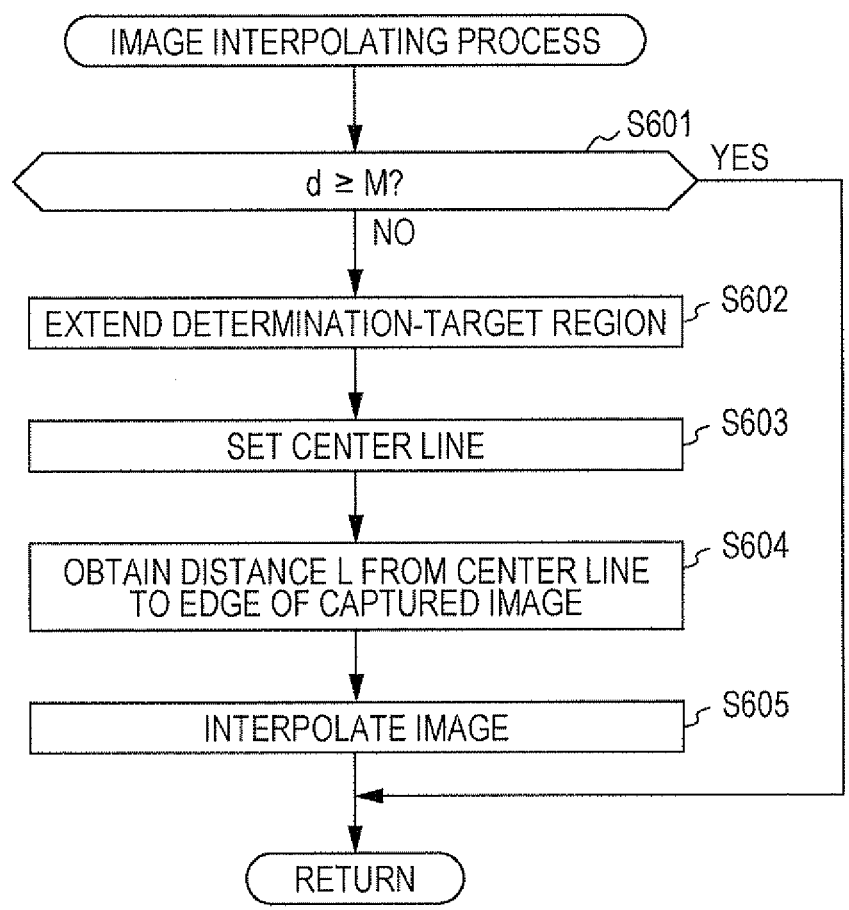
FIG. 16 is a flowchart of an image interpolation process.

Next, the flow of the image interpolation process of S305, S405, and S505 will be described with reference to the flowchart of FIG. 16.

When a distance (d) from the center of the determination-target region to an edge of the captured image is not equal to or longer than a threshold (M) (NO in S601), the image processing apparatus 10 extends the determination-target region so that a side of the determination-target region will be aligned with the edge of the captured image and the size of the determination-target region will be 2M pixels×2M pixels (S602). The image processing apparatus 10 sets, as a center line, the longest line segment among line segments that are associated with binarized images included in the extended determination-target region and that are parallel to the edge of the captured image (S603).

The image processing apparatus 10 calculates a distance L from the set center line to the edge of the captured image (S604). The image processing apparatus 10 moves a partial region from an edge of the determination-target region that faces the edge of the captured image with respect to the center line in the extended determination-target region to a position that is symmetric with respect to the center line, thereby interpolating an image included in the determination-target region (S605). The partial region is constituted by (M−L) pixels in the direction perpendicular to the center line and 2M pixels in the direction parallel to the center line. After S605 or when the distance (d) from the center of the determination-target region to an edge of the captured image is equal to or longer than the threshold (M) (YES in S601), the image processing apparatus 10 returns to the step of performing the image interpolation process.

In the image processing system 1 according to the present exemplary embodiment, which is described above, a first narrowing-down process is performed, on the basis of a color or color density, on candidates for NRBCs (the target cells) included in maternal blood. Then, a second narrowing-down process is performed, on the basis of the size and shape of NRBCs, on candidates that have been obtained by the first narrowing-down process. The determination-target region is set on the basis of a result of the second narrowing-down process. The first to third image feature values that have been obtained from the determination-target region are compared with the criteria that have been learned on the basis of the positive and negative examples of NRBCs to determine whether or not an NRBC is included in the determination-target region. Accordingly, in addition to a reduction in the load of the process of detecting NRBCs included in maternal blood, compared with that in the case where pattern matching is performed on each candidate for a cell, the image processing system 1 is not easily influenced by the differences among the individual test pieces of maternal blood or the differences among image capture conditions or the like.

The present invention is not limited to the above-described exemplary embodiment. For example, in the above-described exemplary embodiment, an example of the image processing system 1 in which a captured image of a test piece is sequentially input from the optical microscope 2 is descried. However, the image processing apparatus 10 may receive, from an information processing apparatus via a communication network, a request to search for the target cell included in a captured image, and may return a result of the search for the target cell to the information processing apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an obtaining unit that obtains a captured image of a test piece including a target cell having a nucleus;
   a setting unit that sets target regions in the captured image, each of the target regions having a given size;
   a filter setting unit that sets a filter in each of the target regions, each filter including a number of first to N-th filter regions, and each filter is configured so that an i-th filter region does not extend outside an (i+1)-th filter region, where N is an integer that is equal to or larger than two and i is any integer in a range of 1 to N−1, and the filter setting unit is configured to change a basic pattern of the filter, the number of the first to N-th filter regions, a size of internal patterns within the basic pattern, and a position of the internal patterns in each filter region;
   a generating unit that, for each filter disposed in each of the target regions set by the setting unit, generates an image feature value based on a difference between the sum of pixel values of pixels included in the odd-numbered filter regions of the filter and the sum of pixel values of pixels included in the even-numbered filter regions of the filter; and
   a determination unit that determines, based on whether or not the image feature value generated by the generating unit satisfies an image-feature-value condition for the image feature value, whether or not the target cell is included in the filter region, the image-feature-value condition being predetermined.

2. The image processing apparatus according to claim 1, wherein the filter setting unit sets the sizes of the first filter region and the N-th filter region based on the size of the connected-pixel group extracted by the second extraction unit and the size of each of the target regions set by the setting unit for the connected-pixel group.

3. The image processing apparatus according to claim 1, further comprising
   a computation unit that divides each of the target regions set by the setting unit into partial regions which are predetermined, that calculates a feature value based on an intensity gradient direction at each of the pixels included in each of the partial regions, and that computes a second image feature value for the target region based on the calculated feature values for the partial regions,
   wherein, when the filter set by the filter setting unit is disposed in each of the target regions set by the setting unit, the generating unit generates the first image feature value based on a difference between the sum of pixel values of the pixels included in the odd-numbered filter regions of the filter and the sum of pixel values of the pixels included in the even-numbered filter regions of the filter, and
   wherein the determination unit determines, based on whether or not each of the first image feature value and the second image feature value satisfies a corresponding one of an image-feature-value condition for the first image feature value and an image-feature-value condition for the second image feature value, whether or not the target cell is included in the filter region, each of the image-feature-value conditions being predetermined.

4. The image processing apparatus according to claim 2, further comprising
   a computation unit that divides each of the target regions set by the setting unit into partial regions which are predetermined, that calculates a feature value based on an intensity gradient direction at each of the pixels included in each of the partial regions, and that computes a second image feature value for the target region based on the calculated feature values for the partial regions, wherein, when the filter set by the filter setting unit is disposed in each of the target regions set by the setting unit, the generating unit generates the first image feature value based on a difference between the sum of pixel values of the pixels included in the odd-numbered filter regions of the filter and the sum of pixel values of the pixels included in the even-numbered filter regions of the filter, and wherein the determination unit determines, based on whether or not each of the first image feature value and the second image feature value satisfies a corresponding one of an image-feature-value condition for the first image feature value and an image-feature-value condition for the second image feature value, whether or not the target cell is included in the filter region, each of the image-feature-value conditions being predetermined.

5. The image processing apparatus according to claim 1, further comprising a computation unit that divides each of the target regions set by the setting unit into partial regions which are predetermined, that calculates a feature value based on an intensity gradient direction at each of the pixels included in each of the partial regions, and that computes a second image feature value for the region based on the calculated feature values for the partial regions, wherein, when the filter set by the filter setting unit is disposed in each of the target regions set by the setting unit, the generating unit generates a third image feature value based on the first image feature value based on a difference between the sum of pixel values of the pixels included in the odd-numbered filter regions of the filter and the sum of pixel values of the pixels included in the even-numbered filter regions of the filter and based on the second image feature value that has been computed by the computing unit for the region, and wherein the determination unit determines, based on whether or not the third image feature value satisfies an image-feature-value condition for the third image feature value, whether or not the target cell is included in the filter region, the image-feature-value condition being predetermined.

6. The image processing apparatus according to claim 2, further comprising a computation unit that divides each of the target regions set by the setting unit into partial regions which are predetermined, that calculates a feature value based on an intensity gradient direction at each of the pixels included in each of the partial regions, and that computes a second image feature value for the region based on the calculated feature values for the partial regions, wherein, when the filter set by the filter setting unit is disposed in each of the target regions set by the setting unit, the generating unit generates a third image feature value based on the first image feature value based on a difference between the sum of pixel values of the pixels included in the odd-numbered filter regions of the filter and the sum of pixel values of the pixels included in the even-numbered filter regions of the filter and based on the second image feature value that has been computed by the computing unit for the region, and wherein the determination unit determines, based on whether or not the third image feature value satisfies an image-feature-value condition for the third image feature value, whether or not the target cell is included in the filter region, the image-feature-value condition being predetermined.

7. The image processing apparatus according to claim 1, wherein the image-feature-value condition is learned by machine learning based on positive and negative examples of the target cell.

8. The image processing apparatus according to claim 2, wherein the image-feature-value condition is learned by machine learning based on positive and negative examples of the target cell.

9. The image processing apparatus according to claim 3, wherein the image-feature-value condition is learned by machine learning based on positive and negative examples of the target cell.

10. The image processing apparatus according to claim 4, wherein the image-feature-value condition is learned by machine learning based on positive and negative examples of the target cell.

11. The image processing apparatus according to claim 5, wherein the image-feature-value condition is learned by machine learning based on positive and negative examples of the target cell.

12. The image processing apparatus according to claim 6, wherein the image-feature-value condition is learned by machine learning based on positive and negative examples of the target cell.

13. An image processing method comprising:
obtaining a captured image of a test piece including a target cell having a nucleus;
setting target regions in the captured image, each of the target regions having a given size;
setting a filter in each of the target regions, each filter including a number of first to N-th filter regions, and each filter is configured so that an i-th filter region does not extend outside an (i+1)-th filter region, where N is an integer that is equal to or larger than two and i is any integer in a range of 1 to N−1, and changing a basic pattern of the filter, the number of the first to N-th filter regions, a size of internal patterns within the basic pattern, and a position of the internal patterns in each filter region;
generating, for each filter disposed in each of the target regions, an image feature value based on a difference between the sum of pixel values of pixels included in the odd-numbered filter regions of the filter and the sum of pixel values of pixels included in the even-numbered filter regions of the filter; and
determining, based on whether or not the generated image feature value satisfies an image-feature-value condition for the image feature value, whether or not the target cell is included in the filter region, the image-feature-value condition being predetermined.

14. A non-transitory computer-readable medium storing a program causing a computer to execute a process, the process comprising:
obtaining a captured image of a test piece including a target cell having a nucleus;
setting target regions in the captured image, each of the target regions having a given size;
setting a filter in each of the target regions, each filter including a number of first to N-th filter regions, and each filter is configured so that an i-th filter region does not extend outside an (i+1)-th filter region, where N is an integer that is equal to or larger than two and i is any integer in a range of 1 to N−1, and changing a basic pattern of the filter, the number of the first to N-th filter regions, a size of internal patterns within the basic pattern, and a position of the internal patterns in each filter region;

generating, for each filter disposed in each of the target regions, an image feature value based on a difference between the sum of pixel values of pixels included in the odd-numbered filter regions of the filter and the sum of pixel values of pixels included in the even-numbered filter regions of the filter; and determining, based on whether or not the generated image feature value satisfies an image-feature-value condition for the image feature value, whether or not the target cell is included in the filter region, the image-feature-value condition being predetermined.

15. An image processing system comprising:
an image processing apparatus;
an optical microscope that is connected to the image processing apparatus; and
a display apparatus that is connected to the image processing apparatus,
the image processing apparatus including
  an obtaining unit that obtains, from the optical microscope, a captured image of a test piece including a target cell having a nucleus,
  a setting unit that sets target regions in the captured image, each of the target regions having a given size,
  a filter setting unit that sets a filter in each of the target regions, each filter including a number of first to N-th filter regions, and each filter is configured so that an i-th filter region does not extend outside an (i+1)-th filter region, where N is an integer that is equal to or larger than two and i is any integer in a range of 1 to N−1, and the filter setting unit is configured to change a basic pattern of the filter, the number of the first to N-th filter regions, a size f internal patterns within the basic pattern, and a position of the internal patterns in each filter region,
  a generating unit that, for each filter disposed in each of the target regions set by the setting unit, generates an image feature value based on a difference between the sum of pixel values of pixels included in the odd-numbered filter regions of the filter and the sum of pixel values of pixels included in the even-numbered filter regions of the filter,
  a determination unit that determines, based on whether or not the image feature value generated by the generating unit satisfies an image-feature-value condition for the image feature value, whether or not the target cell is included in the filter region, the image-feature-value condition being predetermined, and
  a unit that causes the display apparatus to display, among the filter regions, a region which has been determined by the determination unit to be a region including the target cell.

16. The image processing apparatus according to claim 1, wherein
  the filter setting unit sets a plurality of filters in each of the target regions, each filter including a number of first to N-th filter regions, and each filter is configured so that an i-th filter region does not extend outside an (i+1)-th filter region, where N is an integer that is equal to or larger than two and i is any integer in a range of 1 to N−1, and the filter setting unit is configured to change a basic pattern of the filter, the number of the first to N-th filter regions, a size of internal patterns within the basic pattern, and a position of the internal patterns in each filter region;
  the generating unit, for each filter disposed in each of the target regions set by the setting unit, generates an image feature value based on a difference between the sum of pixel values of pixels included in the odd-numbered filter regions of each filter of the plurality of filters and the sum of pixel values of pixels included in the even-numbered filter regions of each filter of the plurality of filters; and
  the determination unit that determines, based on whether or not the image feature value of each filter generated by the generating unit satisfies the image-feature-value condition for the image feature value, whether or not the target cell is included in the filter region, the image-feature-value condition being predetermined.

* * * * *